United States Patent
Zhang et al.

(10) Patent No.: US 9,879,769 B2
(45) Date of Patent: Jan. 30, 2018

(54) TORQUE CONVERTER CLUTCH SLIP CONTROL

(71) Applicant: GM Global Technology Operations LLC, Detroit, MI (US)

(72) Inventors: Zhen J. Zhang, West Bloomfield, MI (US); Bryan P. Jagielo, Wixom, MI (US); Jose C. Zavala Jurado, Brighton, MI (US); Evan P. Anderson, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 152 days.

(21) Appl. No.: 15/093,327

(22) Filed: Apr. 7, 2016

(65) Prior Publication Data

US 2017/0292594 A1   Oct. 12, 2017

(51) Int. Cl.
 *F16H 45/02* (2006.01)
 *F16H 59/14* (2006.01)
(52) U.S. Cl.
 CPC ............. *F16H 45/02* (2013.01); *F16H 59/14* (2013.01)
(58) Field of Classification Search
 CPC .................................. F16H 45/02; F16H 59/14
 See application file for complete search history.

(56) References Cited

U.S. PATENT DOCUMENTS

| 5,531,302 A * | 7/1996 | Koenig ................. F16H 61/143 192/3.3 |
| 8,463,515 B2 | 6/2013 | Hebbale et al. |
| 2007/0287594 A1* | 12/2007 | DeGeorge ............. F16H 61/143 477/176 |
| 2009/0192017 A1* | 7/2009 | Lee ........................ F16H 61/143 477/169 |
| 2011/0060509 A1* | 3/2011 | Otanez .................. F16H 61/143 701/58 |
| 2011/0166757 A1* | 7/2011 | Otanez .................. B60W 50/06 701/60 |

\* cited by examiner

*Primary Examiner* — David J Hlavka (57) ABSTRACT

A powertrain includes a torque generative device and a torque converter having an impeller, a turbine and a torque converter clutch. A method to control torque converter slip includes a feedforward component and a feedback component. The feedforward component includes monitoring a reference slip, and actual slip, and a turbine speed of the torque converter, determining a desired turbine torque based upon the reference slip and the turbine speed, determining an actual turbine torque based upon the actual slip and the turbine speed, determining a feedforward torque converter clutch pressure command based upon the desired turbine torque, the actual turbine torque, a torque generative device torque, and a TCC gain, and determining feedforward torque converter clutch pressure command. The feedback component modifies the feedforward command pressure based on proportional plus integral plus differential (PID) slip feedback terms.

13 Claims, 4 Drawing Sheets

TORQUE CONVERTER CLUTCH SLIP CONTROL

BACKGROUND OF THE INVENTION

Torque converters are commonly used to transfer drive torque from an engine to a transmission. A torque converter can provide torque multiplication, smooth ratio changing on acceleration, and good torsional vibration damping. Because a torque converter uses fluid coupling between its input and its output, there are inherent inefficiencies due to losses in the fluid. To realize better fuel economy, auto makers use a locking clutch, known as a torque converter clutch or TCC, to mechanically lock the input to the output to reduce losses at steady state speed conditions. In lower gears and at low vehicle speeds, the TCC cannot be locked because a locked drivetrain would pose drivability concerns. In order to strike a balance between vehicle drivability and fuel economy, systems have been developed that control the TCC to allow a small rotational speed difference, also known as slip, between the torque converter input and output. The technology of controlling a TCC to allow a controlled amount of slip is generally known as Electronically Controlled Capacity Clutch (ECCC).

Improvements in TCC slip control are desired to allow further improvements in vehicle drivability and fuel economy.

BRIEF SUMMARY OF THE INVENTION

A powertrain includes a torque generative device and a torque converter having an impeller, a turbine and a torque converter clutch. A method to control torque converter slip includes a feedforward component and a feedback component. The feedforward component includes monitoring a reference slip, and actual slip, and a turbine speed of the torque converter, determining a desired hydraulic torque based upon the reference slip and the turbine speed, determining an actual hydraulic torque based upon the actual slip and the turbine speed, and determining a feedforward torque converter clutch pressure command based upon the desired hydraulic torque, the actual hydraulic torque, a torque generative device torque, and a TCC gain and offset. The feedback component modifies the feedforward command pressure based on proportional plus integral plus derivative (PID) slip terms.

BRIEF DESCRIPTION OF THE SEVERAL VIEWS OF THE DRAWINGS

Embodiments of the invention will be described with reference to the accompanying drawings, in which.

DETAILED DESCRIPTION OF THE INVENTION

Figure 1:
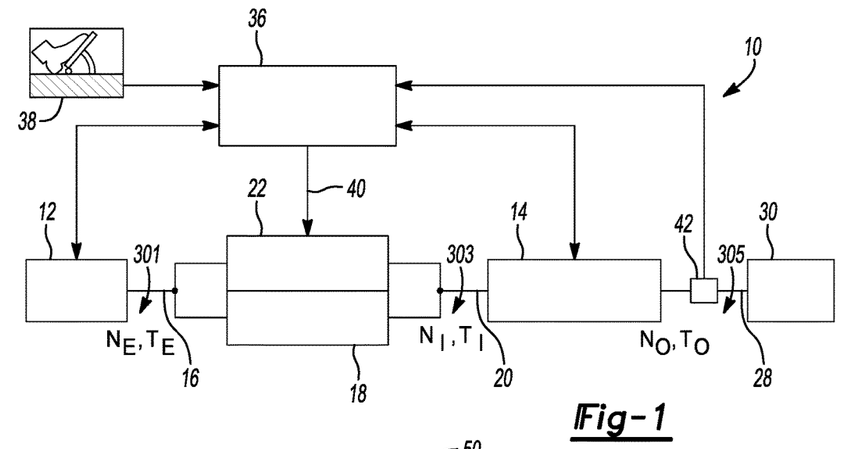
FIG. 1 is a block diagram showing exemplary powertrain components of a vehicle.

Referring now to the drawings, wherein the showings are for the purpose of illustrating certain exemplary embodiments only and not for the purpose of limiting the same, FIG. 1 is a block diagram of various powertrain components of a vehicle 10. The powertrain components include an engine 12 and a transmission 14. An output shaft 16 of the engine 12 is coupled to the input (i.e. impeller or pump) of a torque converter 18, and an input shaft 20 of the transmission 14 is coupled to the output (i.e. turbine) of the torque converter 18. The torque converter 18 transfers rotational energy from the engine 12 to the transmission 14 using hydraulic fluid so that the engine 12 can be mechanically disengaged from the transmission 14 when necessary. A TCC 22, which can be actuated between a fully engaged position, a slip mode where slip occurs, and a fully disengaged position, applies a TCC torque for controlling a torque converter slip in the torque converter 18 between the engine 12 and the transmission 14. Engine output power 301 is depicted as engine rotational speed $N_E$ measured in revolutions per minute (RPM) and engine torque $T_E$ measured in Newton-meters. Likewise, transmission input power 303 is depicted as transmission input speed $N_I$ (input speed) and transmission input torque $T_I$. $T_I$ also describes the torque of the turbine of torque converter 18 or the turbine torque $T_T$. The torque slip in the torque converter 18 is defined as $N_E$-$N_I$. An output shaft 28 of the transmission 14 is coupled to a driveline 30 of the vehicle 10 that distributes the engine power to the vehicle wheels in a manner that is well understood to those having ordinary skill in the art. Transmission output power 305 is depicted as the output speed No and the output torque $T_O$.

The vehicle 10 also includes a controller 36 intended to represent both an engine controller and a transmission controller; however, it will be appreciated that these two controlling functions can be served by a single device or a plurality of communicatively connected devices. The controller 36 receives a throttle position signal from a vehicle throttle 38, and provides a signal to the engine 12 to provide the necessary engine speed and a signal to the transmission 14 to provide the necessary gear to satisfy the throttle demand. Additionally, the controller 36 provides a signal on line 40 to the TCC 22 to control an actuation pressure P to achieve the desired torque converter slip, for example, according to an ECCC control. According to one exemplary method, the desired torque converter slip is a function of a transmission gear state, an engine torque, and a turbine or input speed. Exemplary use of the input speed is used in this context as an indirect measure of output speed or vehicle speed. A sensor 42 measures the output behavior of the transmission 14. In one exemplary embodiment, the sensor 42 measures the rotational speed of the output shaft 28 of the transmission 14 and sends a speed signal to the controller 36. Suitable non-limiting examples for the sensor 42 include an encoder or a speed sensor.

The controller 36, as described above, can be a single device or a number of devices. Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. Controller 36 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular time intervals during ongoing engine and vehicle operation. Alternatively, algorithms may be executed in response to occurrence of an event.

Figure 2:
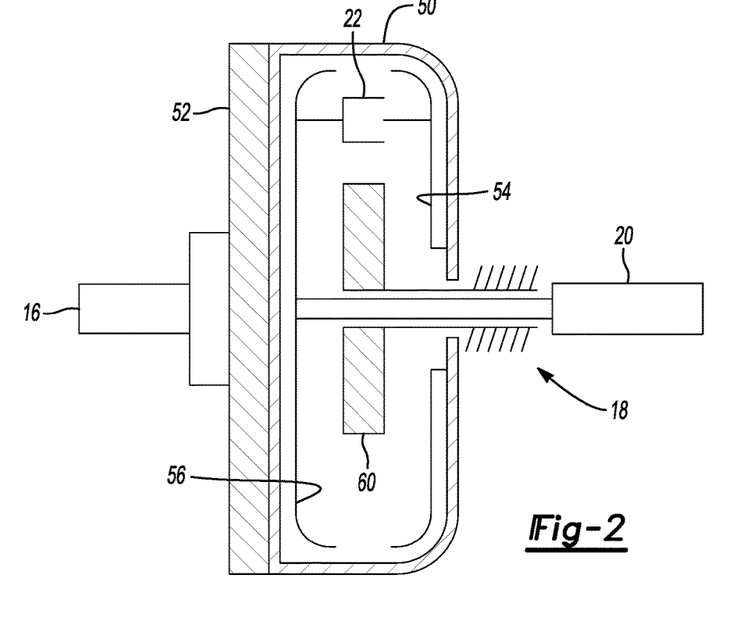
FIG. 2 is a schematic of an exemplary torque converter as may be included in the exemplary powertrain of FIG. 1.

Referring now to FIG. 2, an exemplary torque converter 18 is illustrated that provides a fluid coupling between the engine 12 and the transmission 14. The torque converter 18 includes a housing 50 that is fixed for rotation with the engine output shaft 16, for example the engine crankshaft, via a flywheel 52. An impeller 54 is fixed for rotation with the housing 50, and a turbine 56 is fixed for rotation with a transmission input shaft 20. A stator 60 is also provided and is fixed from rotation. The interior of the torque converter 18 is filled with a viscous fluid. Rotation of the impeller 54 induces corresponding motion of the viscous fluid, which is directed towards the turbine 56 by the stator 60 to induce rotation of the turbine 56. While the coupling device 18 is described as a simplified torque converter, it should be appreciated that the coupling device 18 may take various other forms without departing from the scope of the present invention.

As the output shaft 16 rotates at an idle speed, the impeller 54 is induced to rotate. However, the idle speed is normally insufficient to overcome braking forces that inhibit the turbine 56 from rotating. As the braking forces are reduced or the engine speed increases, the impeller 54 drives the viscous fluid into the turbine 56 and the turbine 56 is induced to rotate. As a result, drive torque is transferred from the engine output shaft 16 through the transmission 14 to propel the vehicle. Upon achieving a point where there is little or no RPM difference between the turbine 56 and impeller 54, the TCC 22 may be engaged to provide a direct drive between the engine 12 and the transmission 14. Under this condition, the impeller 54 is mechanically coupled to the turbine 56, so that the rotational speed of the turbine 56 is about equal to the speed of the output shaft 16.

A slip mode of the TCC 22 is also provided. The slip is determined as the difference between the rotational speed of the output shaft 16 and the rotational speed of the transmission input shaft 20, where the transmission input shaft 20 is employed to transmit power from the coupling device 18 to the transmission 14. The slip mode occurs by changing a clutch actuation pressure P that is supplied to the TCC 22 by a hydraulic control system (not shown). The magnitude of the actuation pressure P is at about a maximum value when the TCC 22 is in the fully engaged position. As the actuation pressure P is decreased, the TCC 22 transitions from the fully engaged position to a fully disengaged position.

Torque converter slip can be controlled by application of TCC torque. The TCC includes structures mechanically, electronically, or fluidically operated to controllably couple the impeller and turbine of the torque converter, modulating an allowed slip therebetween. When the TCC is fully released, the fluidic interaction between the impeller and the turbine controls slip. The torque being transmitted through the torque converter is torque converter torque or turbine torque, transmitted in the fluidic interaction between the impeller and the turbine. TCC torque substantially equals zero when the TCC is fully released. When the TCC is fully locked, no slip between the impeller and turbine is possible, and the TCC torque equals the torque being transmitted through the torque converter. When the TCC is in a slip mode, the torque being transmitted through the torque converter includes some fraction of the torque as TCC torque, and the remainder of the torque being transmitted through the torque converter is turbine torque. In one exemplary control method, the pressure of hydraulic fluid to the TCC controls forces applied within the TCC and the resulting TCC torque so that the torque converter slip approaches a desired slip value or a reference slip. By reducing the pressure of the hydraulic fluid in the torque converter, torque converter slip for a given operating condition will increase. Similarly, by increasing the pressure of the hydraulic fluid in the torque converter, torque converter slip for a given operating condition will decrease.

Feedback control monitors a desired value, controls an output according to the desired value, and utilizes a resulting value of the controlled output to subsequently improve control to the desired value. Feedback control is known to control slip in a torque converter through variable control of a TCC. A desired torque converter slip can be monitored, a TCC pressure command can be modulated in order to control resulting torque converter slip, and the resulting torque converter slip can be used in a feedback loop to subsequently modulate the TCC pressure command. In this way, feedback TCC pressure can be utilized to control torque converter slip to a desired value. The desired value can be a steady state term, substantially unchanging through a time period, or the desired value can be transitory, for example, increasing or decreasing through a period or changing according to an exemplary step profile.

While torque converter slip can be controlled to some small value in steady state operation, rapid and significant increases in $N_E$ and $T_E$ consistent with rapidly increasing or tip-in throttle demands are known to result in rapid increases in torque converter slip. Excess slip reduces fuel efficiency of the powertrain and torque output to the output shaft and must be reduced in a timely method. Feedback control is inherently reactionary and includes a lag time in the control response. Further, feedback control of torque converter slip, described above, responding to a rapid change in torque converter slip, can result in unpredictable changes to the torque converter slip, for example, feedback induced increases in TCC pressure commands resulting in the slip quickly being reduced to zero. Rapidly changing slip resulting in zero slip can result in perceptible and undesirable effects to drivability.

Feedforward control methods are known to predict operation of a system through transient operation and generate control commands based upon the predicted operation of the system. Feedforward control can be utilized in combination with feedback control to improve the accuracy of control and counter the effects of the feedback lag. A method and system for TCC control is described in commonly owned U.S. Pat. No. 8,463,515, the entire disclosure of which is hereby incorporated by reference.

Feedforward control methods, in combination with feedback control, are applied to control of a TCC in the present embodiment of the invention. Such an exemplary system includes a pressure control term described by the following equation.

TCC_pressure_command=feed_forward_term+feedback_term    [1]

In this way, the TCC is controlled based upon a feedback TCC pressure command and a feedforward TCC pressure command.

Methods to determine the feedforward portion of TCC control are based upon different inputs. For example, feedforward control of the TCC is based upon engine torque, $T_E$. In one exemplary embodiment, feedforward control is made proportional to $T_E$. An increase or decrease in $T_E$ creates a corresponding increase or decrease in commanded TCC torque. In another embodiment, feedforward TCC control is calibrated according to $T_E$ and corresponding behavior in the torque converter. In such an embodiment, a look-up table, a programmed functional relationship, or a model based upon the calibration can be utilized to determine a feedforward portion of TCC control for a monitored $T_E$ input.

Torque converter slip affects operation and drivability of the vehicle. Too much slip in steady state reduces fuel efficiency; too little slip in steady state results in reduced drivability. Too much or too little slip in transient conditions can cause a runaway slip condition, resulting in a loss of power to the output, or a locked up clutch or clutch "crashed" condition. However, a desired slip in a transition may not equal a desired slip in steady state conditions. For example, during a commanded acceleration, slip can be increased to a controlled level, allowing the engine to quickly accelerate, and then subsequently reduced to rapidly increase output torque through the transmission. In such an embodiment, it may be desirable to disable feedback control of the slip during the controlled increase of slip to avoid undesirable operation of the torque converter. Setting such a desired slip value for feedforward TCC control can be described as selecting a reference slip.

A reference or desired torque converter clutch slip can be used to determine the feedforward pressure command. Such a reference slip can be determined or calibrated for a particular engine configuration based upon fuel efficiency and NVH (noise, vibration, harshness) performance and priorities. Determination of the feedforward pressure command can advantageously include actual slip in addition to reference slip.

A method for determining a feedforward control of a TCC includes monitoring a reference slip, an actual slip, an input speed, and an engine torque; determining a turbine torque based upon the reference slip and the input speed; and determining the feedforward control of the TCC based upon the hydraulic torque, the engine torque, and a TCC gain. Determining the hydraulic torque based upon the reference slip, the actual slip, and the input speed can take a number of exemplary embodiments. For example, a Kotwicki method known in the art can be utilized to determine desired and actual turbine torque based upon the reference slip, the actual slip, and the input speed. Another example includes utilizing a K-factor look-up table to determine desired and actual hydraulic torque based upon the reference slip, actual slip, and the input speed. These two non-limiting examples are explained in greater detail herein.

In general, when the torque converter is operating in a slip mode, a portion of the torque received from the engine is transmitted as clutch torque through the TCC, with the remainder of the engine torque transmitted as turbine torque $T_T$. The turbine torque TT is also referred to herein as hydraulic torque. The present invention calculates a target clutch torque by determining a term that is a weighted sum of the actual hydraulic torque (derived from the actual slip) and the desired hydraulic torque (derived from the reference slip). This weighted sum is then subtracted from the engine torque to obtain the target clutch torque, according to the equation:

$$\text{TargetClutchTorque}=T_E-(K1*\text{Actual}T_T+K2*\text{Desired}T_T) \quad [2]$$

where $T_E$ is the engine torque, $\text{Actual}T_T$ is the actual hydraulic torque, $\text{Desired}T_T$ is the desired hydraulic torque, and K1 and K2 are weighting factors. It should be noted that the weighting factors K1 and K2 have no relationship to the "K-factor" described below that may be used to characterize a torque converter.

A method is described utilizing a Kotwicki model to estimate a hydraulic torque and determining a feedforward pressure based upon the hydraulic torque. In the discussion of the Kotwicki model that follows, the term "pump" is used to represent the impeller 54 described relative to FIG. 2. Teachings of the Kotwicki model can be found in SAE paper No 820393 1983. A multi-region Kotwicki model that provides hydraulic torque $T_T$ is illustrated by the following equation:

$$T_T=a_1(i)\omega_{pump}^2+a_2(i)\omega_{pump}\omega_{turbine}+a_3(i)\omega_{turbine}^2 \quad [3]$$

The term $\omega_{pump}$ of the Kotwicki model can be expressed as the speed of the torque generative device of the powertrain, for example an engine speed $N_E$ or, in the event of an electrically driven or hybrid driven powertrain utilizing a torque converter, a motor speed. The term $\omega_{turbine}$ of the Kotwicki model can be expressed as the speed of the turbine in the torque converter or the input speed, $N_I$, of the transmission input shaft attached to the turbine. The terms $a_1(i)$, $a_2(i)$, and $a_3(i)$ are Kotwicki coefficients. According to one exemplary embodiment, the Kotwicki coefficients are determined by a regression fit of experimental data for a particular torque converter. The Kotwicki model includes different equations for different regions of operation. The regions in which the Kotwicki model can operate can be described according to a number of embodiments. In one embodiment, regions or modes can be described. A converter mode in drive is defined; a coupling mode in drive is defined; and a coast mode in coast is defined.

Such regions or modes defining Kotwicki model operation can be selected based upon functional relationships, for example, inputting $N_I$ and $N_E$, with the functional relationships being defined by desired torque converter operation according to methods known in the art. According to one embodiment, the experimental test data available for torque converters is in a dimensionless format, which have to be converted to speeds and torques before regression analysis. In one exemplary embodiment, four ratios can be used to represent torque converter data.

A first ratio is a speed ratio that is determined from $\omega_{pump}$ and $\omega_{turbine}$, as expressed by the following equation.

$$\text{Speed\_Ratio}=\omega_{turbine}/\omega_{pump} \quad [4]$$

It will be appreciated that speed ratio is a dimensionless ratio that can alternatively be expressed in terms of $N_I$ divided by $N_E$.

A second ratio is a torque ratio, determined from pump torque (or engine or motor torque), $T_P$, and turbine torque, $T_T$, as expressed by the following equation.

$$\text{TorqueRatio}=T_T/T_P \quad [5]$$

It will be appreciated that torque ratio is a dimensionless ratio that can alternatively be expressed in terms of $T_I$ divided by $T_E$.

A third ratio is a K-factor, as expressed by the following equation.

$$K\text{-factor} = \omega_{pump}/\sqrt{T_P} \quad [6]$$

It will be appreciated that K-factor can alternatively be expressed in terms of $N_E$ and $T_E$.

A fourth ratio is an efficiency percentage, which can be expressed by the following equation.

$$\text{Efficiency \%} = (\omega_{turbine} T_T)/(\omega_{pump} T_{pump}) \times 100\% \quad [7]$$

It will be appreciated that efficiency percentage can alternatively be expressed in terms of $N_T$, $T_T$, $N_E$, and $T_E$.

When converter data is processed in terms of these ratios, the torque ratio, K-factor, and efficiency are all single valued functions of speed ratio. In other words, a given torque converter, at a given speed ratio, produces one and only one value of torque ratio, K-factor, and efficiency without regard to the absolute levels of torque and speed.

An exemplary data set for a torque converter contains torque ratio and K-factor values at different speed ratios, the speed ratios ranging from 0 (representing a stall ratio) to 1.0. The torque ratio is maximum at stall, usually between 1.5 and 2.5. The torque ratio decreases monotonically as speed ratio increases, and at a speed ratio of approximately 0.9 the torque ratio becomes exactly 1.0. The speed ratio at which the torque ratio becomes 1.0 is known as the coupling point. When the speed ratio is above 0.9 or the coupling point, the torque ratio remains constant at 1.0. The K-factor is nearly constant from the stall ratio to about 0.6 speed ratio and then begins to increase rapidly. The operation of the torque converter from stall to coupling point is known as a converter mode. Beyond the coupling point operation is called a coupling mode. Because the torque ratio remains constant in the coupling mode, indicating $T_T$ equal to $T_P$, the Kotwicki coefficients in the coupling mode are different from the coefficients in the converter mode.

According to one embodiment, the relationship described in Equation 3 is modified to describe each of the regions. In the converter mode in drive, pump torque (or engine or motor torque) $T_P$, and turbine torque $T_T$, can be expressed as follows.

$$T_P = a_1 \omega_{pump}^2 + a_2 \omega_{pump} \omega_{turbine} + a_3 \omega_{turbine}^2 \quad [8]$$

$$T_T = b_1 \omega_{pump}^2 + b_2 \omega_{pump} \omega_{turbine} + b_3 \omega_{turbine}^2 \quad [9]$$

In the coupling mode, the torques can be expressed as follows.

$$T_P = T_T = c_1 \omega_{pump}^2 + c_2 \omega_{pump} \omega_{turbine} + c_3 \omega_{turbine}^2 \quad [10]$$

In the coast mode, the torques can be expressed as follows.

$$T_P = T_T = d_1 \omega_{pump}^2 + d_2 \omega_{pump} \omega_{turbine} + d_3 \omega_{turbine}^2 \quad [11]$$

In this way, coefficients for the different regions of the Kotwicki model can be determined and utilized to determine $T_T$ in each of the regions.

Figure 3:
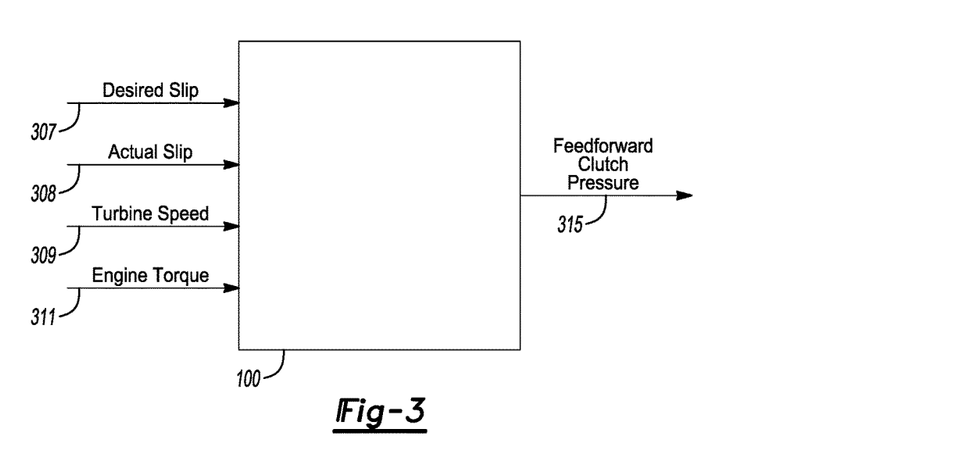
FIG. 3 schematically depicts an exemplary module to determine a feedforward pressure command, according to an aspect of the present disclosure.

FIG. 3 schematically depicts an exemplary module to determine a feedforward pressure command, in accordance with the present disclosure. Module 100 is depicted. Inputs to module 100 include a target or reference torque converter slip 307, an actual torque converter slip 308, a turbine speed 309 and an engine torque 311. As described above, the target or reference slip is a desired slip level. The turbine speed term 309 may be measured transmission input speed. The engine torque term 311 may be an estimated value received, for example, from an engine controller. Based upon these inputs, module 100 outputs a feedforward pressure command 315 for the TCC. It will be appreciated that module 100, the inputs to module 100, and the outputs from module 100 can be processed by a number of different embodiments and remain consistent with the methods described herein.

Figure 4:
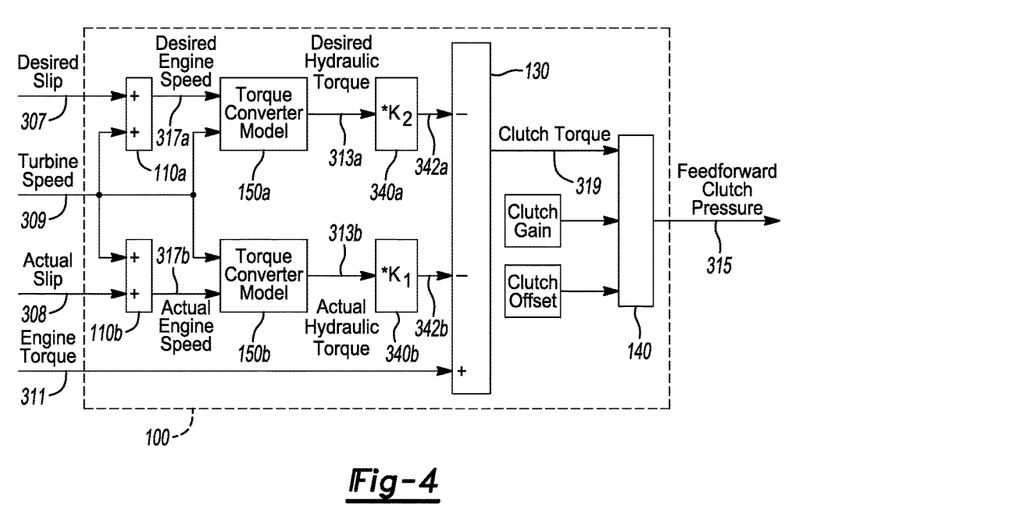
FIG. 4 schematically depicts a non-limiting example of the module of FIG. 3.

FIG. 4 schematically depicts in greater detail an exemplary embodiment of module 100 shown in FIG. 3 to determine a feedforward pressure command utilizing an exemplary torque converter model, in accordance with the present disclosure. Module 100 includes summing blocks 110a and 110b, torque converter model modules 150a and 150b, a summing block 130, and gain factor block 140. Inputs to module 100 include reference slip 307, actual slip 308, turbine speed 309, and engine torque 311. Summing block 110a adds the reference slip 307 and the turbine speed 309 in order to determine a desired or reference engine speed 317a. Torque converter model module 150a receives the reference engine speed 317a and turbine speed 309 and outputs desired turbine torque 313a, in accordance with the methods described herein. The desired turbine torque 313a is multiplied by a weighting factor K2 in block 340a to produce a weighted desired turbine torque contribution 342a. Similarly, summing block 110b adds the actual slip 308 and the turbine speed 309 in order to determine an actual engine speed 317b. Torque converter model module 150b receives the actual engine speed 317b and turbine speed 309 and outputs actual turbine torque 313b. The actual turbine torque 313b is multiplied by a weighting factor K1 in block 340b to produce a weighted actual turbine torque contribution 342b. Summing module 130 combines weighted desired turbine torque contribution 342a, weighted actual turbine torque contribution 342b, and engine torque 311 to determine target TCC torque 319 as described by Equation 2 above. Gain factor block 140 inputs the target TCC torque 319, applies a TCC gain term and a TCC offset term, and outputs a feedforward pressure command 315. The TCC gain and TCC offset can be determined by calibration, modeling, or any method sufficient to describe a relationship between TCC torque and TCC pressure and can include different values for different conditions and operating ranges.

Figure 5:
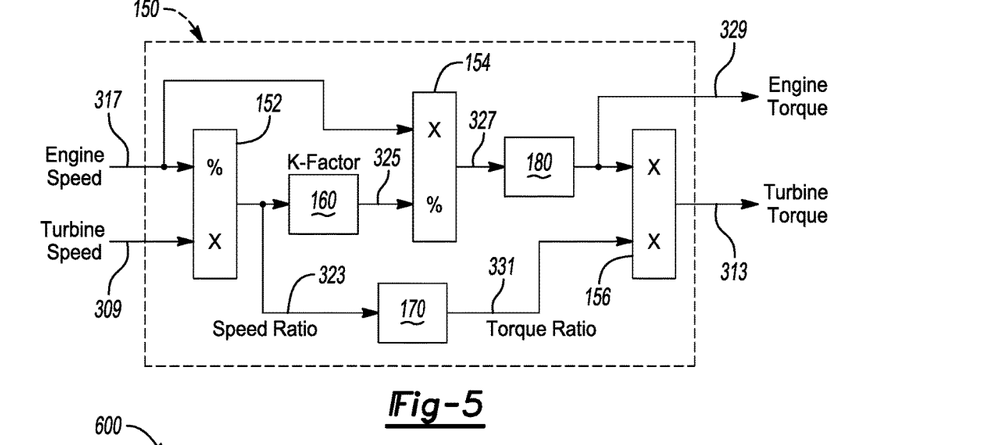
FIG. 5 schematically depicts a non-limiting example of a torque converter model as may be found in the diagram of FIG. 4.

As described above, a Kotwicki model as described relative to Equations 3 and 8-11 may be used in the torque converter models 150a and/or 150b of FIG. 4 to relate engine speed, turbine speed, and hydraulic torque. As an alternative exemplary method to determine turbine torque, a look-up table utilizing a determinable relationship based upon a speed ratio can be utilized to determine turbine torque. FIG. 5 schematically depicts an exemplary module to determine a turbine torque utilizing a K-factor look-up table, in accordance with the present disclosure. K-factor is a parameter that relates engine speed and turbine speed of a torque converter as described by Equation 6 above. Engine speed 317 and turbine speed 309 are inputs to module 150. Multiplication division module 152 divides turbine speed 309 by engine speed 317 to generate speed ratio 323. K-factor look-up module 160 receives speed ratio 323 and looks up a determinable K-factor output 325 based upon tabulated values. Multiplication division module 154 divides the engine speed 317 by the K-factor output 325 to determine signal 327. Signal 327 is an input to squaring module 180, which outputs an estimated engine torque signal 329. Torque ratio module 170 inputs speed ratio 323, applies a functional relationship between speed ratio and torque ratio, and outputs torque ratio 331. Multiplication module 156 inputs estimated engine torque signal 329 and the torque ratio 331 and outputs turbine torque 313. In this way, a K-factor look-up table can be utilized to generate a turbine torque. It will be appreciated that module 150 can be utilized to represent module 150*a*, 150*b* in the exemplary module of FIG. 4 to determine a feedforward pressure command.

Figure 6:
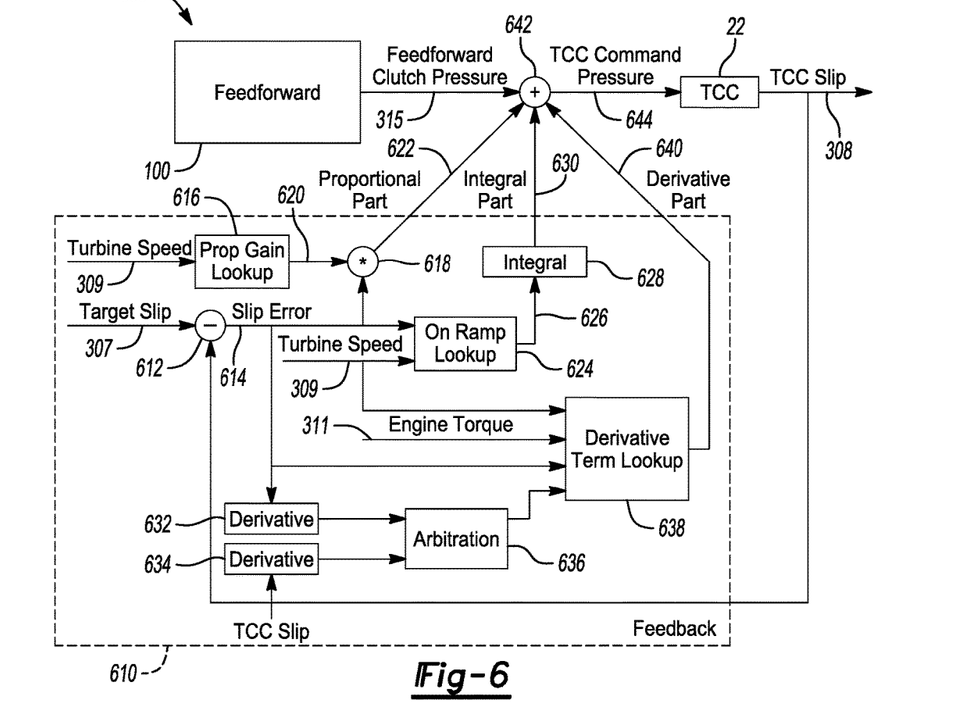
FIG. 6 is a block diagram that depicts non-limiting elements of a feedback portion of a controller incorporating aspects of the present invention.

FIG. 6 depicts a simplified block diagram of a slip control system 600 incorporating aspects of the present invention. The slip control system 600 includes a feedforward portion 100 and a feedback portion 610. The feedforward portion 100 has been previously discussed, for example in relation to FIG. 4. The feedback portion 610 incorporates elements of PID (proportional—integral—differential) control.

With continued reference to FIG. 6, TCC slip 308 is subtracted from target slip 307 at operation 612, resulting in determination of slip error 614. At operation 618 the slip error 614 is multiplied by a proportional gain factor 620, which is determined in proportional gain lookup block 616. Advantageously the proportional gain factor 620 may be a function of the turbine speed 309. The product of the slip error 614 and the proportional gain factor 620 is indicated as the proportional part 622 of the feedback control block 610.

The slip error 614 is also an input to an on ramp lookup block 624. The on ramp lookup block determines a value of an on ramp signal 626 based on the slip error 614 and the turbine speed 309. The on ramp signal 626 is provided to an integrator 628. The integral of the on ramp signal 626 is indicated as the integral part 630 of the feedback control block 610.

The slip error 614 is also an input to a first differentiator 632, the output of which is the derivative with respect to time of the slip error 614. A second differentiator 634 calculates the derivative with respect to time of the TCC slip 308. The output of the first differentiator 632 and the output of the second differentiator 634 are provided as inputs to an arbitration block 636. The arbitration block 636 selects which of the two inputs is passed forward, with the selection based on the turbine speed 309. The output of the arbitration block, i.e. either the derivative of the slip error 614 or the derivative of the TCC slip 308, is provided to the derivative term lookup block 638. The derivative term lookup block 638 provides the derivative part 640 of the feedback control block 610. Advantageously the derivative part 640 determined in the derivative term lookup block 638 may also be a function of the turbine speed 309, the engine torque 311, and/or the slip error 614.

With continued reference to FIG. 6, the feedforward clutch pressure 315 from feedforward module 100, the proportional part 622 of the feedback control 610, the integral part 630 of the feedback control 610, and the derivative part 640 of the feedback control 610 are summed at operation 642. The resultant sum represents a TCC command pressure 644, which is applied to TCC 22 to control the TCC slip 308.

Figure 7:
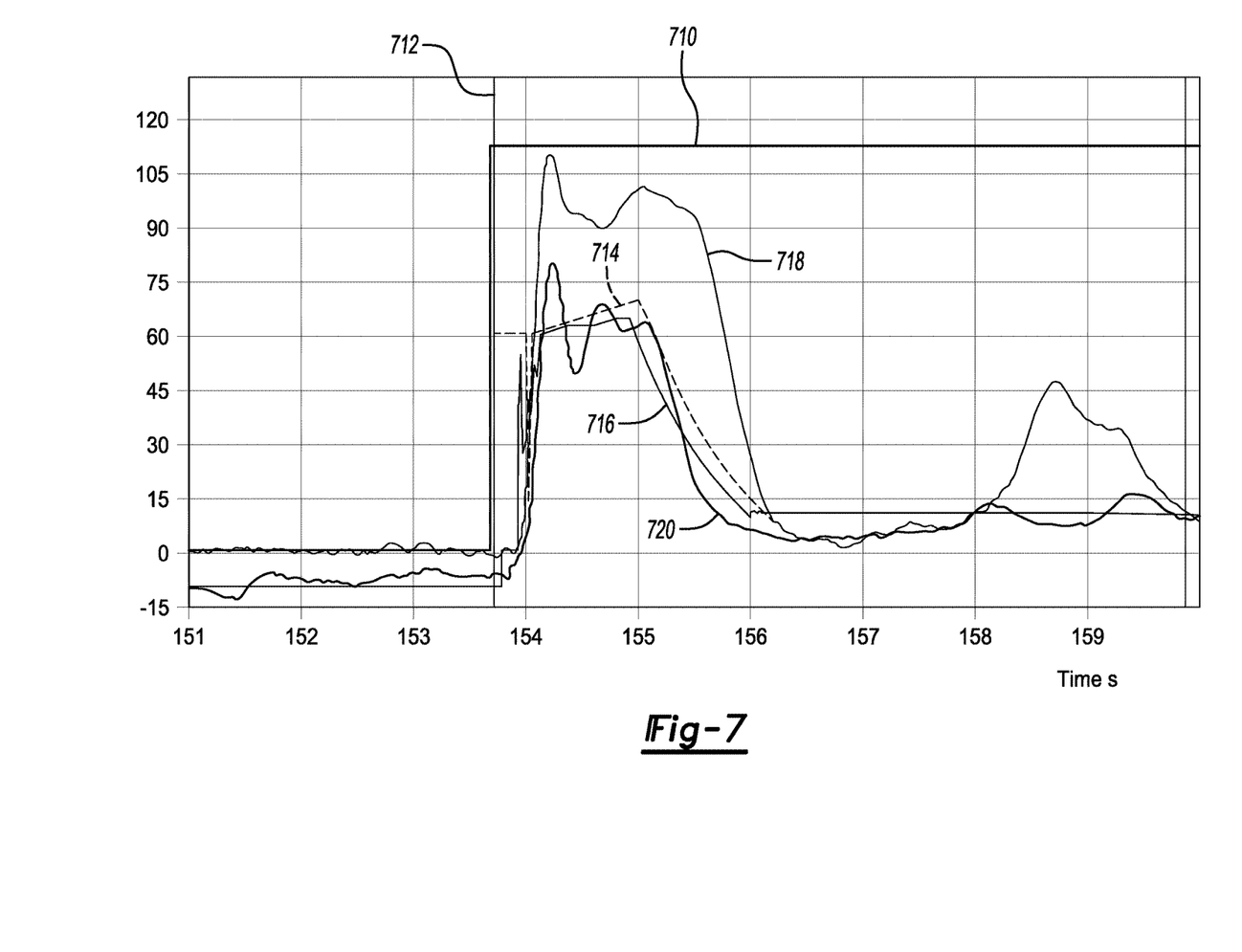
FIG. 7 is a chart that depicts the performance of a slip control system according to the present disclosure.

FIG. 7 depicts exemplary operation of a vehicle powertrain including a tip in event and operation to a desired slip level in response to the tip in event in accordance with the present disclosure, as well as a depiction of the response to a baseline system that does not include all of the features of the present disclosure. In FIG. 7 the x-axis denotes time in seconds, and the y-axis depicts a TCC slip in RPM. Trace 710 in FIG. 7 depicts an accelerator pedal position. During the time period prior to the time indicated by the vertical line 712, the vehicle is operating at 50 mph in $8^{th}$ gear. At the time indicated by the vertical line 712, the accelerator is abruptly moved to a position corresponding to a 15% tip in. With continued reference to FIG. 7, trace 714 represents the target or reference slip called for by the baseline system, and trace 716 represents the target or reference slip called for by the system operating according to the present disclosure. In both cases, the reference slip in response to the tip in event is approximately 60 RPM, which represents an increase from typical reference TCC slip values in steady state operation. Such an increase in slip during a tip in event permits the engine speed to rapidly increase during the tip in event. A rapid increase in engine speed permits the engine output to rapidly increase and additionally provides a perceptible change in the engine operation in response to the operator input (pedal position). As shown in FIG. 7, after a period in which the target slip is approximately 60 RPM, the target slip as shown in traces 714 and 716 is decreased to approximately 15 RPM.

FIG. 7 also includes a trace 718 that depicts the actual measured TCC slip for the baseline system, which can be compared to the target slip for the baseline system indicated in trace 714. FIG. 7 further includes a trace 720 that depicts the actual measured TCC slip for the system operating in accordance with the present disclosure, which can be compared to the target slip indicated in trace 716. As is evident in the depicted data, applying the feedforward and feedback strategies described herein results in control of TCC slip closer to the target values.

The above methods describe engine speed and/or engine torque as an input to the various modules or methods. It will be appreciated in hybrid drive or electric drive applications wherein a torque converter and associated torque converter clutch is utilized, the engine terms including engine speed and engine torque can be substituted with appropriate motor terms or torque generative device terms.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method to control torque converter slip in a powertrain comprising a torque generative device and a torque converter comprising an impeller, a turbine and a torque converter clutch, the method comprising:
    monitoring an actual torque converter slip;
    monitoring a desired torque converter slip;
    monitoring a turbine speed of the torque converter;
    determining a desired hydraulic torque based upon the desired slip and the turbine speed;
    determining an actual hydraulic torque based upon the actual slip and the turbine speed;
    determining a feedforward torque converter clutch command pressure based upon the actual hydraulic torque, the desired hydraulic torque, a torque generative device torque, and a torque converter clutch gain;
    determining a slip error as the difference between the desired torque converter slip and the actual torque converter slip;
    determining an overall torque converter clutch command pressure by combining the feedforward torque converter clutch command pressure and a feedback torque converter clutch command pressure; and
    controlling the torque converter clutch slip based upon the overall torque converter clutch command pressure.

2. The method of claim 1, wherein determining the desired hydraulic torque based upon the desired slip and the turbine speed comprises utilizing a turbine torque determination selected from the group consisting of a Kotwicki model and a K-factor look-up table.

3. The method of claim 1, wherein determining the actual hydraulic torque based upon the actual slip and the turbine speed comprises utilizing a turbine torque determination selected from the group consisting of a Kotwicki model and a K-factor look-up table.

4. The method of claim 1 wherein the feedback torque converter clutch command pressure is based on a term proportional to the slip error, a term related to the integral of the slip error, and a term selected from the group consisting of a term related to the derivative of slip error and a term related to the derivative of the actual slip.

5. The method of claim 4, wherein selection between the term related to the derivative of slip error and the term related to the derivative of the actual slip is made based on the turbine speed.

6. The method of claim 1 wherein the step of determining a feedforward torque converter clutch command pressure based upon the actual hydraulic torque, the desired hydraulic torque, a torque generative device torque, and a torque converter clutch gain comprises combining the product of a first weighting factor and the actual turbine torque with the product of a second weighting factor and the desired turbine torque.

7. A system to control torque converter slip in a powertrain comprising a torque generative device and a torque converter comprising an impeller, a turbine and a torque converter clutch, the system comprising a controller configured to:
monitor an actual torque converter slip;
monitor a desired torque converter slip;
monitor a turbine speed of the torque converter;
determine an actual hydraulic torque based upon the desired slip and the turbine speed;
determine a desired hydraulic torque based upon the actual slip and the turbine speed;
determine a feedforward torque converter clutch command pressure based upon the actual hydraulic torque multiplied by a first weighting factor, the desired hydraulic torque multiplied by a second weighting factor, a torque generative device torque, and a torque converter clutch gain;
determine a slip error as the difference between the desired torque converter slip and the actual torque converter slip;
determine an overall torque converter clutch command pressure by combining the feedforward torque converter clutch command pressure and a feedback torque converter clutch command pressure; and
control the torque converter clutch based upon the overall torque converter clutch command pressure.

8. The system of claim 7, wherein the desired hydraulic torque based upon the desired slip and the turbine speed is determined utilizing a turbine torque determination selected from the group consisting of a Kotwicki model and a K-factor look-up table.

9. The system of claim 7, wherein the actual hydraulic torque based upon the actual slip and the turbine speed is determined utilizing a turbine torque determination selected from the group consisting of a Kotwicki model and a K-factor look-up table.

10. The system of claim 7, wherein the feedback torque converter clutch command pressure is based on a term proportional to the slip error, a term related to the integral of the slip error, and a term selected from the group consisting of a term related to the derivative of slip error and a term related to the derivative of the actual slip.

11. The system of claim 10, wherein selection between the term related to the derivative of slip error and the term related to the derivative of the actual slip is made based on the turbine speed.

12. The system of claim 7, wherein the torque generative device comprises an engine.

13. A controller comprising a processor and a non-transitory computer-readable medium containing instructions that, when executed, perform the method comprising the steps of:
monitoring an actual slip of a torque converter;
monitoring a desired slip of the torque converter;
monitoring a turbine speed of the torque converter;
determining an actual turbine torque based upon the desired slip and the turbine speed;
determining a desired turbine torque based upon the actual slip and the turbine speed;
determining a feedforward torque converter clutch command pressure based upon the actual turbine torque, the desired turbine torque, a torque generative device torque, and a torque converter clutch gain;
determining a slip error as the difference between the desired torque converter clutch slip and the actual slip of the torque converter;
determining an overall torque converter clutch command pressure by combining the feedforward torque converter clutch command pressure and a feedback torque converter clutch command pressure; and
controlling a torque converter clutch based upon the overall torque converter clutch command pressure.

* * * * *